Figure 1:
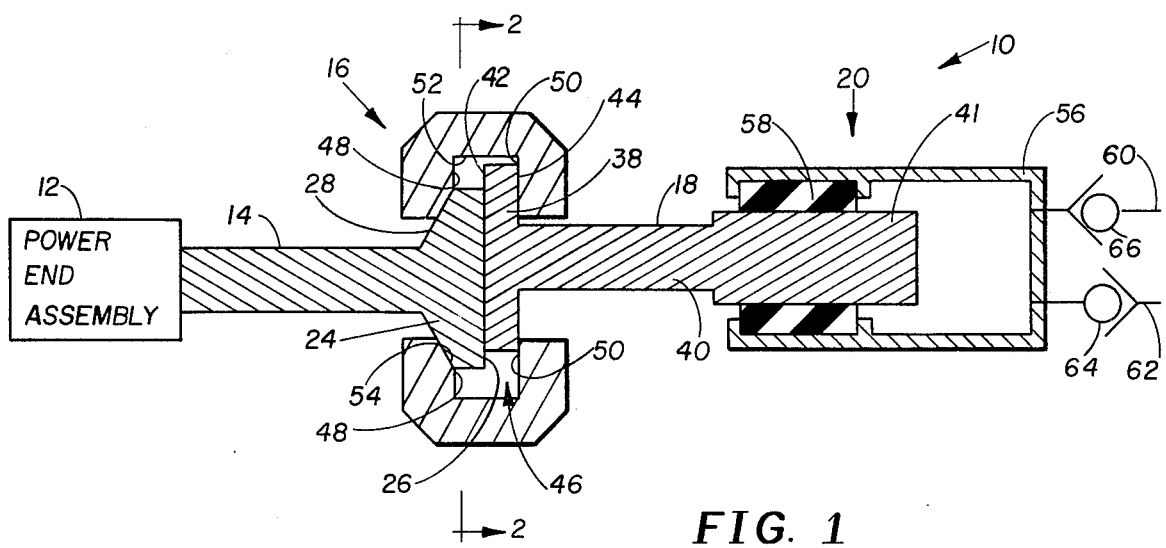

United States Patent [19]

Labyer et al.

[11] 4,033,701
[45] July 5, 1977

[54] CLAMP — SELF ALIGNING

[75] Inventors: Harold S. Labyer; James C. Dodson, both of Duncan, Okla.

[73] Assignee: Halliburton Company, Duncan, Okla.

[22] Filed: Apr. 8, 1976

[21] Appl. No.: 674,693

[52] U.S. Cl. .............................. 403/13; 403/338; 285/165
[51] Int. Cl.² ........................................ B25G 3/00
[58] Field of Search ............ 403/338, 335, 336, 13; 285/224, 165, 166

[56] References Cited

UNITED STATES PATENTS

| 3,244,424 | 4/1966 | Cope ............................. 285/165 X |
| 3,744,577 | 7/1973 | Williams ....................... 403/338 X |
| 3,868,832 | 3/1975 | Biffle ............................ 403/338 X |

Primary Examiner—Wayne L. Shedd
Attorney, Agent, or Firm—John H. Tregoning

[57] ABSTRACT

A clamp for positive coupling of two reciprocative rods in parallel axial alignment. The clamp includes a tapered wall portion and a flat radial wall portion. The tapered wall portion cooperates with a tapered shoulder on one of the rods to provide positive clamping while the flat wall portion cooperates with a flat radial shoulder on the other of the rods to provide limited transverse movement of the rods relative to one another.

2 Claims, 3 Drawing Figures

CLAMP — SELF ALIGNING

This invention relates to a clamp, and further relates to a clamp for coupling reciprocative rods. This invention still further relates to a clamp for coupling reciprocative rods in parallel axial alignment.

The coupling of reciprocative rods is desirable for many purposes, among such purposes being the connection of the push rod and plunger of a reciprocating pump.

Since it is sometimes necessary to remove the plunger of a reciprocating pump in order to inspect, repair or replace the packings therein, it is advantageous to so construct the pump that the push rod and plunger be separate pieces connected by a clamp which can be removed to allow for disassembly.

It has also been a problem that the fluid end assembly and power end assembly of a pump may be misaligned slightly and thus the packing of the fluid end would be unevenly worn were the plunger connected in coaxial alignment with the push rod. However, clamps which allow for such misalignment, such as that of U.S. Pat. No. 2,634,683, provide no adjustment to allow for both initial transverse movement of the coupled rods within the clamp and positive adjustable clamping.

A solution to this problem is provided by the apparatus of the present invention, which provides an adjustable clamp for positive coupling of adjacent end portions of two reciprocative rods in parallel axial alignment, comprising an outwardly tapered shoulder, on said adjacent end portion of one of said rods and facing away from an adjacent end thereof; a first flat transverse end surface on said adjacent end portion of said one of said rods; a second flat transverse end surface on said adjacent end portion of the other of said rods, said second end surface being adapted for planar abutment with said first end surface; a flat radial shoulder perpendicular to the axis of said other of said rods on said adjacent end portion of said other of said rods and facing away from an adjacent end thereof; at least two ring sectors each having a radially inward facing recess having first and second walls and a bottom, said first wall having a tapered portion conforming to said tapered shoulder and said second wall having a radial surface conforming to said radial shoulder; connector means for positioning said ring sectors about said end portions with said second walls slidably abutting said radial shoulder and for thereafter adjustably forcing said first wall to slide inwardly along said tapered shoulder whereby said radial shoulder is forcibly held in non-slidable contact with said second wall.

A further aspect of the invention provides a clamp for coupling two reciprocative rods of a mechanical assembly such as to effect alignment of an enclosed reciprocating portion of one of the rods within its enclosure, said coupling comprising an outwardly tapered head on one of said rods; a flat radial head on the other of said rods; a pair of semicircular sections, each having a radially inward facing cavity extending substantially uniformly along the arc of each said section and each cavity having a first and second wall and a bottom; each said first wall having a flat radial surface adapted to slidably receive said flat radial head; each said second wall having a substantial portion thereof angled toward the bottom of said cavity and adapted to slidably receive said outwardly tapered head; and means for jointly positioning each semicircular section to encase the heads for permitting temporary transverse movement of the rods relative to each other to establish alignment of the reciprocating portion within its enclosure and for fixing the established alignment.

The apparatus of this invention is more fully described in the attached drawings, which include:

FIG. 1, a side cross-sectional view of a pump which includes the clamp of this invention, showing parallel vertical axial alignment.

Figure 2:
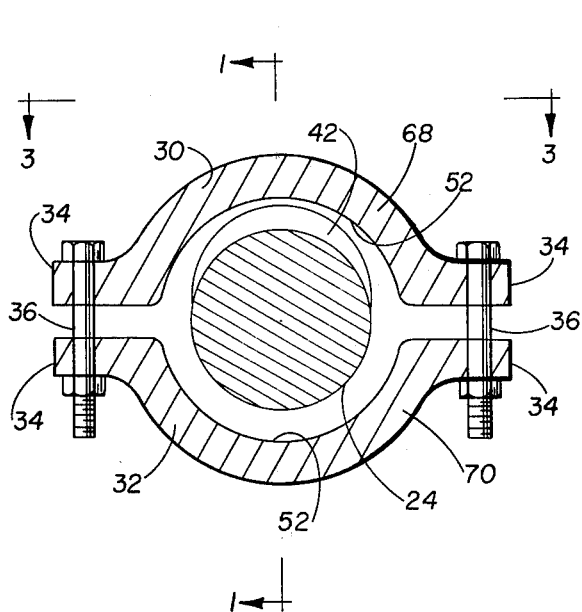

FIG. 2, a transverse cross-sectional along lines 2—2 of FIG. 1 showing the clamp of this invention.

Figure 3:
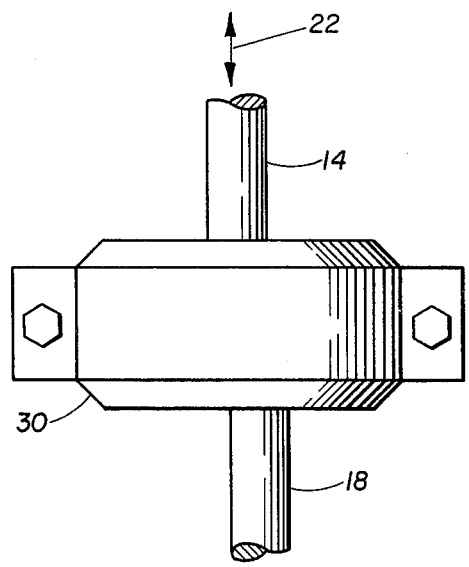

FIG. 3, a partial top view along lines 3—3 of FIG. 2 showing the clamp of the invention with parallel horizontal axial alignment.

Pump 10 comprises power end assembly 12, push rod 14, clamp 16, plunger 18 and fluid end assembly 20. Power end assembly 10 can be any conventional power means for reciprocating push rod 14 along a fixed line of reciprocation 22. Push rod 14 is provided with an outwardly tapered head 24 having a flat transverse end surface 26. "Transverse" as used herein means orthogonal to the line of reciprocation 22. Head 24 has an outwardly tapered shoulder 28 facing away from end surface 26. Head 24 can be formed integral with push rod 14 or could be a separate part attachable to push rod 14 by threads or other means for firm connection therebetween.

Clamp 16 comprises a pair of ring sectors 30 and 32 having outwardly projecting flanges 34 thereon for receiving bolts 36 to tighten the ring sectors 30 and 32 about head 24 and a head 38 described below.

Plunger 18 comprises an end portion or head 38, a rod portion 40 and piston portion 41. Head 38 is a flat radial flange with a flat transverse end surface 42 adapted to engage flat transverse end surface 26 of tapered head 24 in planar abutment. Head 38 has a flat radial shoulder 44 facing away from end surface 42. Head 38 can be formed integral with rod portion 40, as shown in FIG. 1, or could be a separate part attachable to rod portion 40 by threads or other firm means of connection. Similarly rod portion 40 could be formed integral with piston portion 41 or could be a separate part attachable to piston portion 41 by threads or other firm connection.

Each of the ring sectors 30 and 32 have a radially inward facing recess 46 defined by a first wall 48, a second wall 50 and a bottom 52. First wall 48 has a tapered portion 54 conforming to tapered shoulder 28 of tapered head 24. Second wall 50 conforms to radial shoulder 44 of flat head 38. Second wall 50 is an annular surface having an inner diameter greater than rod portion 40 and less than the outer diameter of shoulder 44 and having an outer diameter greater than the outer diameter of shoulder 44. Bottom 52 is of a width sufficient to allow tapered portion 54 to engage tapered shoulder 28 and second wall 50 to engage radial shoulder 44 while flat transverse end surfaces 26 and 42 are slightly separated so as to allow relative sliding between end surfaces 26 and 42 and prior to full tightening of clamp 16. Bottom 52 must be of sufficient diameter to prevent contact between head 24 and bottom 52 during the tightening process. Bottom 52 must also be of a greater diameter than head 38 so as to allow head 38 to move transversely within recess 46 to achieve parallel axial alignment.

Fluid end assembly 20 can be a conventional fluid end asssembly and comprises an enclosure 56, a packing 58, an inlet 62, an outlet 60, an inlet check valve 64 and an outlet check valve 66. Check valves 64 and 66 cooperate with piston portion 41 to produce a pumping action in response to reciprocation of piston portion 41 within enclosure 56. Packing 58 serves to prevent leakage between piston portion 41 and enclosure 56.

The operation of the invention will now be described. Push rod 14 and plunger 18 are brought into a position of adjacency with end surfaces 26 and 42 in slidable abutment. Ring sectors 30 and 32 are placed around heads 24 and 38 with tapered portion 54 in loose contact with tapered shoulder 28 and radial shoulder 44 in loose contact with second wall 50. Bolts 36 are inserted into flanges 34 and loosely tightened. Power end assembly 12 is then operated, preferably slowly to reciprocate push rod 14 and thereby reciprocating plunger 18 within fluid end assembly 20. Plunger 18 will automatically tend to center itself in coaxial alignment with packing 58, since a non-coaxial position would result in lateral forces upon plunger 18 due to uneven compression of the packing. The initial loose contact of end surface 26 with end surface 42 and of shoulder 44 with second wall 50 allows plunger 18 to move laterally to such a coaxial position yet still be held to push rod 14 by clamp 16. The transverse orientation of end surfaces 26 and 42 maintains push rod 14 and plunger 18 in a parallel axial alignment so long as surfaces 26 and 42 are in planar abutment.

After a number of reciprocations of push rod 14 and plunger 18 sufficient to allow plunger 18 to center itself within packing 58, bolts 36 are tightened to hold surfaces 26 and 42 in tight planar abutment. This is accomplished by the sliding of tapered portions 54 inwardly along tapered shoulder 28 in response to further tightening of bolts 36. It will be noted that bolts 36 can be tightened further after clamp 16 has been in operation for an extended time, if further tightening is needed due to wear between the elements of the coupling.

"Parallel axial alignment" as used herein to describe the relationship between push rod 14 and plunger 18 includes coaxial alignment therebetween. Further, the term parallel axial alignment refers to parallel alignment of the axis of movement of push rod 14 and plunger 18 and not necessarily to the geometrical axis, which could be designed at variance with the axis of movement. For smoothest operation, it would be preferable to have the geometric axis of plunger 18 and the axis of movement of plunger 18 be colinear to eliminate torque or twisting forces on plunger 18 as plunger 18 is reciprocated by push rod 14.

While FIGS. 1–3 show use of the invention to compensate for vertical misalignment, it will be apparent to those skilled in the art that the invention could be used to compensate for horizontal misalignment or some combination thereof. In fact, the connected members need not lie horizontal as shon in FIGS. 1–3, but could be at any chosen orientation. Flanges 34 are optional. Bolts 36 could be made to pass through the body portions 68, 70 of ring sectors 30, 32 throgh suitable cutouts. In such case, bolts 36 could be used as restraints to prevent heads 24 and 38 from moving in one direction so as to create a clamp which adjusts only for misalignment in one direction.

Also, neither the mating surfaces 54 and 28 nor 42 and 44 need be continuous, although continuity would be preferable from a manufacturing standpoint.

It will be understood that these and other modifications can be made within the scope of the invention and the following claims will be understood to include such modifications as do not depart from the broad scope of the invention.

I claim:

1. An adjustable self centering clamp for positive self-aligning coupling of adjacent end portions of two reciprocative rods in parallel alignment with the axes thereof laterally displaced, said clamp comprising:
   an outwardly tapered shoulder, on said adjacent end portion of one of said rods and facing away from an adjacent end thereof;
   a first flat transverse end surface means, on said adjacent end portion of said one of said rods, for allowing lateral movement of the rods relative to one another while maintaining a positive coupling force on the rods;
   a second flat transverse end surface means, on said adjacent end portion of the other of said rods, disposed in laterally slidable abutment with said first flat transverse end surface means;
   a flat radial shoulder perpendicular to the axes of said other of said rods on said adjacent end portion of said other of said rods and facing away from an adjacent end thereof;
   at least two ring sectors each having a radially inward facing recess having first and second walls and a bottom, said first wall having a tapered portion conforming to said tapered shoulder and said second wall having a radial surface conforming to said radial shoulder; and
   connector means positioning said ring sectors about said end portions with said second wall slidably abutting said radial shoulder and for thereafter adjustably forcing said first wall to slide inwardly along said tapered shoulder whereby said radial shoulder is forcibly held in non-slidable contact which said second wall;
   said two ring sectors being operable, when engaged with said end portions of said two reciprocative rods and with said first and second transverse end surfaces slideably engaged to cooperate with said end portions to permit unitary reciprocative movement of said two rods,
      with the axes of said two rods undergoing mutual displacement in response to said reciprocating movement while remaining in mutually, generally parallel relation, and
      with said end portions of said two reciprocative rods remaining in generally axially abutting relation;
   said two ring sectors being operable to undergo joint reciprocating movement with said two rods, while said axes of said two rods are mutually displaced,
      with said tapered portion and tapered shoulder cooperating to wedgingly urge said end portions of said two reciprocative rods into a relatively mutually immobilized condition with said axes thereof being mutually displaced;
   said first flat transverse end surface and said second flat transverse end surface being alternately subjected to pushing and pulling forces during said reciprocating movement and being mutually displaceable, generally transversely of said reciprocating movement and in response thereto, to effect said mutual displacement of said axes of said two rods during, and in response to, said reciprocating movement; and said two ring sectors remaining substantially centered in relation to said one of said rods and said outwardly tapered shoulder thereof during said mutual displacement of rod axes, while said other of said rods and said flat radial shoulder thereof are laterally displaced relative to said two ring sectors during and in response to said reciprocating movement as permitted by relatively reduced frictional engagement between said first and second flat transverse end surface means existing while said end surface means are slidably engaged prior to said relative immobilizing of said axes of said rods.

2. A self centering clamp for coupling two reciprocative rods of a mechanical assembly such as to maintain said clamp centered relative to one of said rods and effect self alignment of an enclosed reciprocative portion of the other of the rods within its enclosure, said clamp with the axes thereof being laterally displaced from the axes of said one rod, comprising:
   a. an outwardly tapered head on one of said rods;
   b. a flat radial head on the other of said rods;
   c. a pair of semi-circular sections, each having a radially inward facing cavity extending substantially uniformly along the arc of each said section and each cavity having a first and second wall and a bottom;
      each said first wall having a flat radial surface slidably receiving said flat radial head;
      each said second wall having a substantial portion thereof angled toward the bottom of said cavity and slidably receiving said outwardly tapered head; and
   d. means jointly positioning each semicircular section to encase the heads for permitting temporary transverse movement of the rods relative to each other to estblish alignment of the reciprocating portion within its enclosure;
   said pair of semi-circular sections being operable, when engaged with said tapered head and flat radial head of said two reciprocative rods and with ends of said rod heads being laterally slidably engaged, to cooperate with said tapered head and flat radial head to permit unitary reciprocative movement of said two rods,
      with the axes of said two rods undergoing mutual displacement in response to said reciprocating movement while remaining in mutually, generally parallel relation, and
      with said tapered head and flat radial head of said two reciprocative rods remaining in generally axially abutting relation;
   said pair of semi-circular sections being operable to undergo joint reciprocating movement with said two rods, while said axes of two rods are mutually displaced,
      with said angled second wall and tapered head cooperating to wedgingly urge said tapered head and flat radial head of said two reciprocative rods into a relatively mutually immobilized condition with said axes thereof being mutually displaced;
   said tapered head and flat radial head being alternately subjected to pushing and pulling forces during said reciprocating movement and being mutually displaceable, generally transversely of said reciprocating movement and in response thereto, to effect said mutual displacement of said axes of said two rods during, and in response to, said reciprocating movement; and
   said pair of semi-circular sections remaining substantially centered in relation to said one of said rods and said tapered head thereof during said mutual displacement of rod axes, while said other of said rods and said radial head thereof are laterally displaced relative to said pair of semi-circular ring sectors during and in response to said reciprocating movement as permitted by relatively reduced frictional engagement between said rod ends while said rod ends are slidably engaged prior to said relative immobilizing of said axes of said rods.

* * * * *